United States Patent
Cheon et al.

(10) Patent No.: US 11,971,140 B2
(45) Date of Patent: Apr. 30, 2024

(54) INSULATING WALL FIXING DEVICE OF LIQUEFIED NATURAL GAS STORAGE TANK

(71) Applicant: DAEWOO SHIPBUILDING & MARINE ENGINEERING CO., LTD., Geoje-Si (KR)

(72) Inventors: Byoung Hee Cheon, Busan (KR); Dong Hyuk Jang, Geoje-si (KR); Say Yoon Park, Seoul (KR)

(73) Assignee: HANWHA OCEAN CO., LTD., Geoje-Si (KR)

(*) Notice: Subject to any disclaimer, the term of this patent is extended or adjusted under 35 U.S.C. 154(b) by 171 days.

(21) Appl. No.: 17/311,492

(22) PCT Filed: Dec. 18, 2019

(86) PCT No.: PCT/KR2019/018051
§ 371 (c)(1),
(2) Date: Jun. 7, 2021

(87) PCT Pub. No.: WO2020/138836
PCT Pub. Date: Jul. 2, 2020

(65) Prior Publication Data
US 2022/0018497 A1 Jan. 20, 2022

(30) Foreign Application Priority Data
Dec. 27, 2018 (KR) .......................... 10-2018-0170190

(51) Int. Cl.
*F17C 3/02* (2006.01)
*B63B 25/16* (2006.01)

(52) U.S. Cl.
CPC .............. *F17C 3/027* (2013.01); *B63B 25/16* (2013.01); *F17C 2203/03* (2013.01); *F17C 2221/033* (2013.01); *F17C 2270/0107* (2013.01)

(58) Field of Classification Search
CPC ...... F16C 11/06; F16C 11/0661; F17C 3/027; F17C 2270/0107; F17C 2203/03; F17C 1/12; F17C 13/001
See application file for complete search history.

(56) References Cited

U.S. PATENT DOCUMENTS

| 3,331,525 A | 7/1967 | Coehn |
| 4,498,410 A | 2/1985 | Budge |
| (Continued) | | |

FOREIGN PATENT DOCUMENTS

| EP | 2261110 A2 | 12/2010 |
| JP | S59-103921 U | 7/1984 |
| (Continued) | | |

OTHER PUBLICATIONS

Extended European Search Report dated Aug. 1, 2022 for EP Application No. 19905191.3 (counterpart of PCT/KR2019/018051).

(Continued)

*Primary Examiner* — Stephen J Castellano
(74) *Attorney, Agent, or Firm* — Knobbe, Martens, Olson, & Bear, LLP

(57) ABSTRACT

An insulating wall fixing device for liquefied natural gas storage tanks includes: a base socket; and a securing stud inserted into the base socket. The base socket is formed on an upper surface thereof with an insertion hole through which the securing stud is inserted into the base socket and has an interior space in which one end of the securing stud is settled. The securing stud includes an insertion portion (Continued)

inserted into the interior space of the base socket through the insertion hole and a fastening portion protruding from the insertion portion outwardly of the base socket. The insertion portion includes a spherical shape and multiple leg members divided by a groove formed from one end of the insertion portion to the other end of the insertion portion. The multiple leg members of the insertion portion are retracted toward the groove.

6 Claims, 3 Drawing Sheets

(56) References Cited

U.S. PATENT DOCUMENTS

| | | | |
|---|---|---|---|
| 2005/0191119 A1* | 9/2005 | Aoshima | F16C 11/0604 403/122 |
| 2011/0217110 A1* | 9/2011 | Argillier | F16B 21/065 403/33 |

FOREIGN PATENT DOCUMENTS

| | | | |
|---|---|---|---|
| JP | H06-030521 | U | 4/1994 |
| JP | 2006-300320 | A | 11/2006 |
| JP | 3136480 | U | 10/2007 |
| JP | 2010-236583 | A | 10/2010 |
| JP | 2013-045614 | A | 3/2013 |
| KR | 10-2012-0017114 | A | 2/2012 |
| KR | 10-2013-0061457 | A | 6/2013 |
| KR | 10-2014-0024729 | A | 3/2014 |
| KR | 10-1571414 | B1 | 11/2015 |
| KR | 10-2016-0024014 | A | 3/2016 |
| KR | 10-1644374 | B1 | 8/2016 |
| KR | 10-1722370 | B1 | 4/2017 |
| WO | 2017/014426 | A1 | 1/2017 |
| WO | 2017/182055 | A1 | 10/2017 |

OTHER PUBLICATIONS

Japanese Office Action issued for JP Application No. 2021-533282, dated Jun. 7, 2022.
International Search Report of PCT Application No. PCT/KR2019/018051—4 pages (dated Apr. 2, 2020).
Office Action dated Dec. 17, 2022 in counterpart KR Application No. 10-2018-0170190 in 5 pages.
Office Action in corresponding Chinese Application No. 201980085973.0 dated Feb. 8, 2023 and its English translation.
Written Opinion in corresponding SG Application No. 11202105633U dated Apr. 11, 2023.
Search Report in corresponding SG Application No. 11202105633U dated Apr. 5, 2023.

* cited by examiner

INSULATING WALL FIXING DEVICE OF LIQUEFIED NATURAL GAS STORAGE TANK

TECHNICAL FIELD

The present invention relates to an insulating wall fixing device for liquefied natural gas storage tanks, and more particularly, to an insulating wall fixing device for liquefied natural gas storage tanks, which can achieve mutual coupling of primary and secondary insulating walls for thermal insulation of a liquefied natural gas tank.

BACKGROUND ART

Natural gas is transported in a gaseous state through onshore or offshore gas pipelines, or transported in a liquid state, that is, in the form of liquefied natural gas (LNG) to a distant destination by an LNG carrier. LNG is obtained by cooling natural gas to a cryogenic temperature (about −163° C.) and has a volume of about 1/600 that of natural gas in a gaseous state. Thus, LNG is suited to long distance transportation by sea.

Structures for transporting or storing LNG, such as an LNG carrier designed to carry LNG by sea to an onshore consumer site, are equipped with a storage tank that can withstand cryogenic temperatures of LNG (commonly referred to as "cargo hold").

Such LNG storage tanks are classified into an independent storage tank and a membrane-type storage tank depending on whether a load of cargo is directly applied to an insulator. Generally, the membrane-type storage tank is classified into a GTT NO 96 storage tank and a MARK III storage tank, and the independent storage tank is classified into a MOSS storage tank and an IHI-SPB storage tank.

The NO 96 storage tank comprises primary and secondary sealing walls constituted of 0.5 mm to 0.7 mm thick Invar (Ni content: 36%) membrane sheets and primary and secondary insulating walls provided in the form of an insulating box fabricated by filling a plywood box with an insulator, such as perlite powder.

Since the primary and secondary sealing walls of the NO 96 storage tank have almost the same degree of liquid tightness and strength, it is possible to safely support cargo for a considerable period of time with only the secondary sealing wall even upon leakage of the primary sealing wall.

In addition, since the insulating walls of the NO 96 storage tank is provided in the form of a wooden box filled with an insulator, the NO 96 storage tank has high compressive strength and rigidity and thus can secure high levels of weldability and welding automation, as compared with the MARK III storage tank.

The MARK III storage tank comprises a primary sealing wall constituted of 1.2 mm thick stainless steel (SUS) membrane sheets, a secondary sealing wall constituted of triplex sheets, and primary and secondary insulating walls provided in the form of an insulating panel fabricated by bonding plywood to an upper or lower surface of polyurethane foam.

The primary sealing wall of the MARK III storage tank has corrugations to absorb thermal contraction caused by LNG at cryogenic temperatures. The corrugations can prevent occurrence of excessive stress on the membrane sheets by absorbing deformation of the membrane sheets.

The MARK III storage tank has disadvantages in terms of installation/fabrication due to a low level of automation of the primary sealing wall, which is constituted of corrugated membrane sheets. However, since the stainless steel membrane and the triplex sheet are less expensive and easier to construct than the Invar membrane and the polyurethane foam has good insulation performance, the MARK III storage tank is widely used.

The primary insulating wall of the membrane-type storage tank is coupled to a fixing device disposed on an upper surface of the secondary insulating wall to be securely mounted on the upper surface of the secondary insulating wall.

FIG. 1 is a schematic view of a typical insulating wall fixing device for LNG storage tanks. Referring to FIG. 1, the typical insulating wall fixing device 10 includes: a base socket 11 securely inserted into a groove formed in a top plywood 21 of a secondary insulating wall 20; and a securing stud 12 screw-coupled to the base socket 11 and having an upwardly protruding end coupled to a primary insulating wall (not shown).

Here, a secondary sealing wall 30 disposed between the primary insulating wall and the secondary insulating wall 20 is tightly welded to the insulating wall fixing device 10 to be closely mounted on the secondary insulating wall 20.

The secondary insulating wall 20 is attached to a hull through an adhesive such as mastic and is thus affected by motion of the hull. Here, the motion of the hull is also transmitted to the insulating wall fixing device 10 mounted on the secondary insulating wall 20, thereby inducing translational and rotational motion of the insulating wall fixing device 10.

The translational and rotational motion of the insulating wall fixing device 10 induced by the motion of the hull acts as a direct load on welds between the insulating wall fixing device 10 and the secondary sealing wall 30, causing stress concentration on the welds.

DISCLOSURE

Technical Problem

It is an aspect of the present invention to provide an insulating wall fixing device for LNG storage tanks, which can flexibly cope with deformation of a secondary insulating wall due to hull motion, thereby reducing load applied to welds between the insulating wall fixing device and the secondary sealing wall.

Technical Solution

In accordance with one aspect of the present invention, there is provided an insulating wall fixing device for LNG storage tanks, including: a base socket; and a securing stud inserted into the base socket, wherein the base socket is formed on an upper surface thereof with an insertion hole through which the securing stud is inserted into the base socket and has an interior space in which one end of the securing stud is settled, the securing stud includes an insertion portion inserted into the interior space of the base socket through the insertion hole and a fastening portion protruding from the insertion portion outwardly of the base socket, the insertion portion having a spherical shape and comprising multiple leg members divided by a groove formed from one end of the insertion portion to the other end of the insertion portion, and the multiple leg members of the insertion portion are retracted toward the groove to enter the insertion hole upon inserting the securing stud into the base socket.

When the insertion portion is completely settled in the interior space of the base socket, the multiple leg members may be returned to an original shape thereof such that the insertion portion can be prevented from escaping from the interior space of the base socket by interference of an outer diameter of the insertion hole of the base socket.

The interior space of the base socket may be provided in the form of a spherical space having a larger outer diameter than the insertion portion.

There is a gap between the interior space of the base socket and the insertion body portion.

The insertion hole may have a slope formed along a circumference thereof and downwardly inclined toward a center of the insertion hole.

The groove may have a cross shape such that four leg members are formed at the one end of the insertion portion.

In accordance with another aspect of the present invention, there is provided an insulating wall fixing device for LNG storage tanks, including: a securing stud, one end of which has a spherical shape; and a base socket having an interior space receiving the one end of the securing stud therein, wherein the interior space of the base socket has a spherical shape such that the securing stud is rotatable with the one end of the securing stud received in the base socket, the base socket is formed on an upper surface with an insertion hole through which the securing stud is inserted into the base socket, the insertion hole having a smaller diameter than the one end of the securing stud, and the securing stud is formed at the one end thereof with a cross-shaped groove such that the one end of the securing stud is retracted to enter the insertion hole upon inserting the securing stud into the base socket.

After insertion of the one end of the securing stud into the interior space of the base socket, the retracted one end of the securing stud is returned to an original shape thereof to be prevented from escaping from the interior space of the base socket by interference of an outer diameter of the insertion hole.

Advantageous Effects

The insulating wall fixing device for LNG storage tanks according to the present invention has a structure in which a securing stud is coupled to a base socket to have free motion in an interior space of the base socket, and thus can flexibly cope with stress caused by hull motion or thermal contraction of insulating walls, thereby preventing stress concentration on welds between the insulating wall fixing device and a secondary sealing wall.

BEST MODE

Figure 1:
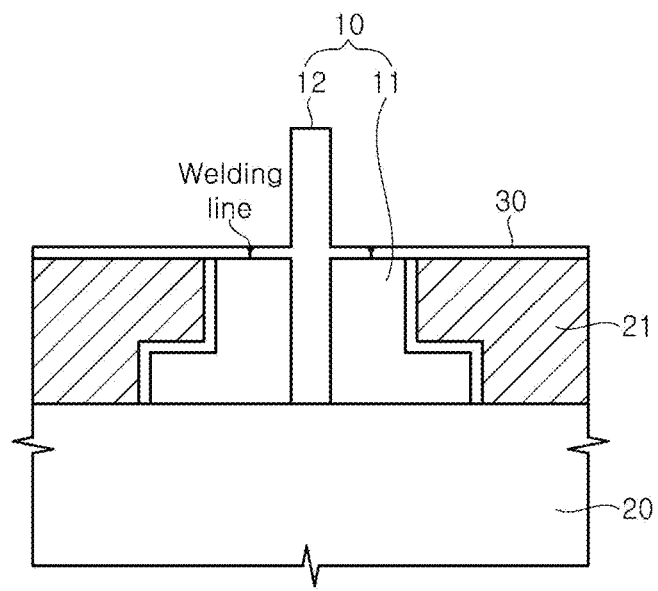
FIG. 1 is a schematic view of a typical insulating wall fixing device for LNG storage tanks.

The above and other aspects, features, and advantages of the present invention will become apparent from the detailed description of the following embodiments in conjunction with the accompanying drawings.

Hereinafter, embodiments of the present invention will be described in detail. Like components will be denoted by like reference numerals throughout the specification.

Herein, the terms "primary" and "secondary" are used to distinguish components providing primary sealing or insulation to an LNG storage tank from components providing secondary sealing or insulation to the LNG storage tank.

In addition, as used herein to describe components of a tank, the term "upper" or "above" refers to an inward direction of the tank, regardless of the direction of gravity, and the term "lower" or "below" refers to an outward direction of the tank, regardless of the direction of gravity.

Figure 2:
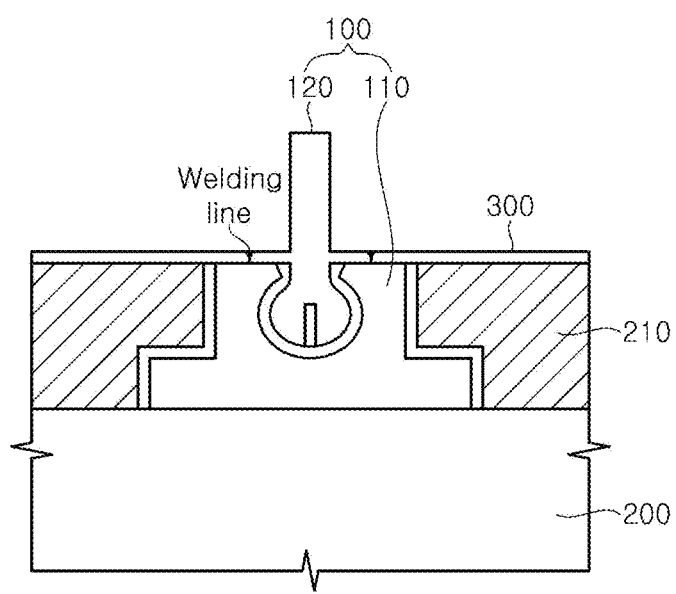
FIG. 2 is a schematic view of an insulating wall fixing device for LNG storage tanks according to the present invention.
Figure 3:
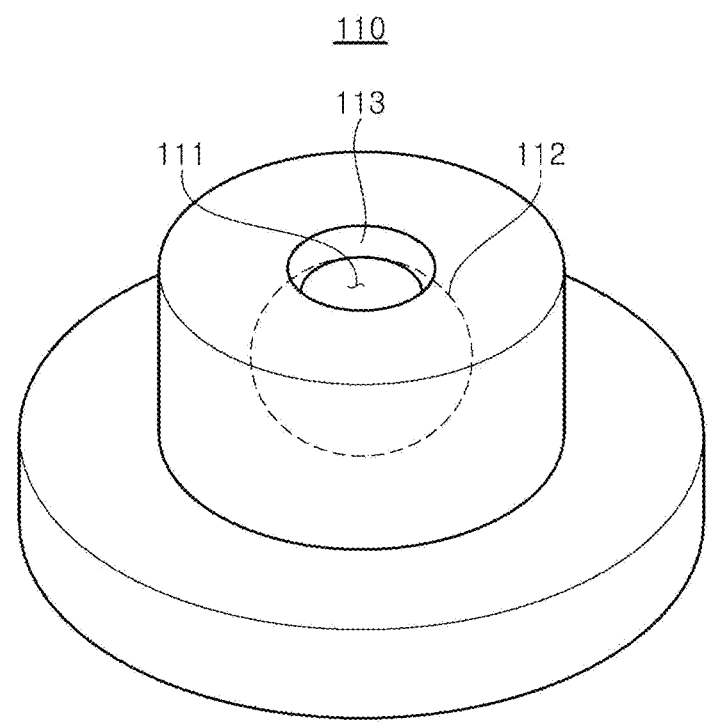
FIG. 3 is a view of a base socket of the insulating wall fixing device according to the present invention.
Figure 4:
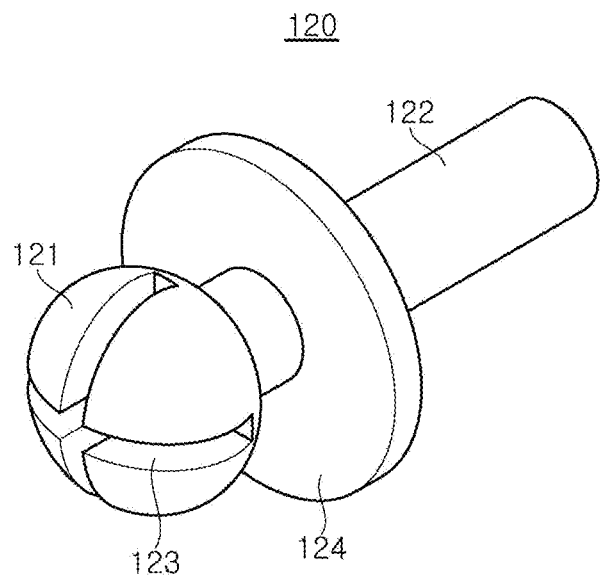
FIG. 4 is a view of a securing stud of the insulating wall fixing device according to the present invention.
Figure 5:
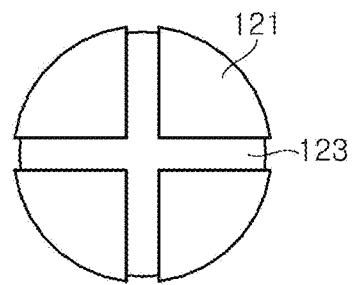
FIG. 5 is a sectional plan view of an insertion portion of the securing stud of FIG. 4.

FIG. 2 is a schematic view of an insulating wall fixing device for LNG storage tanks according to the present invention, FIG. 3 is a view of a base socket of the insulating wall fixing device according to the present invention, FIG. 4 is a view of a securing stud of the insulating wall fixing device according to the present invention, and FIG. 5 is a sectional plan view of an insertion portion of the securing stud of FIG. 4.

Referring to FIG. 2 to FIG. 5, an insulating wall fixing device 100 for LNG storage tanks according to the present invention includes: a base socket 110 securely inserted into a groove formed in a top plywood 210 of a secondary insulating wall 200; and a securing stud 120 thread-coupled to the base socket 110 and having an upwardly protruding end coupled to a primary insulating wall (not shown).

The base socket 110 has an outwardly protruding lower portion to have a stepped cross-section to be securely inserted into a stepped groove formed in the top plywood 210 of the secondary insulating wall 200.

The base socket 110 may be formed on an upper surface thereof with an insertion hole 111 through which the securing stud 120 is inserted into the base socket 110 and may have an interior space 112 in which one end of the securing stud 120 is settled.

Here, the insertion hole 111 may have a smaller diameter than an insertion portion 121 of the securing stud 120 described below, and the interior space 112 of the base socket 110 may be provided in the form of a spherical space having a larger outer diameter than the insertion portion 121.

There is a gap 130 between the interior space 112 of the base socket and the insertion body portion 121.

In addition, the insertion hole 111 formed on the upper surface of the base socket 110 may have a slope 113 formed along a circumference thereof to facilitate insertion of the securing stud 120 described below. The slope 113 may be downwardly inclined toward a center of the insertion hole.

The securing stud 120 may include an insertion portion 121 having a generally spherical shape and inserted into the base socket 110 and a fastening portion 122 protruding from the insertion portion 121 outwardly of the base socket 110 and having an end coupled to the primary insulating wall.

The generally spherical insertion portion 121 may have a cross-shaped groove 123 formed to a predetermined depth from one end of the insertion portion to the other end of the insertion portion.

Accordingly, the insertion portion 121 is formed at the one end thereof with four leg members divided by the groove 123, wherein the four leg members are retractable toward the groove 123.

The securing stud 120 may further include a disk-shaped seated portion 124 outwardly protruding along a circumference of the fastening portion 122, wherein the seated portion 124 may be welded at an end thereof to a secondary sealing wall 300 after being seated on an upper surface of the base socket 110.

Next, a process of installing an insulating system using the insulating wall fixing device 100 according to the present invention will be described.

First, the base socket 110 is securely inserted into the top plywood 210 of the secondary insulating wall 200, followed by inserting the securing stud 120 into the insertion hole 111 formed on the upper surface of the base socket 110.

Here, as the securing stud 120 is introduced into the base socket 110 along the inclined surface 113 of the insertion hole 111 of the base socket 110, the four leg members of the insertion portion 121 is retracted, causing reduction in diameter of the insertion portion 121, thereby facilitating insertion of the insertion portion 121 into the insertion hole 111.

When the insertion portion 121 of the securing stud 120 is completely settled in the interior space of the base socket 110, the four leg members of the insertion portion 121 are returned to an original shape thereof, such that the insertion portion 121 is prevented from escaping from the inner surface of the base socket 110 by interference of the outer diameter of an entrance (the insertion hole) of the base socket 110.

When the securing stud 120 is completely settled in the interior space of the base socket 110, the seated portion 124 of the securing stud 120 is seated on the upper surface of the base socket 110. Then, the secondary sealing wall 300 may be tightly welded to the end of the seated portion 124 to be closely mounted on the secondary insulating wall 200.

Then, the primary insulating wall (not shown) may be fastened to the fastening portion 122 of the securing stud 120 to be mounted on the secondary sealing wall 300.

As described above, the insulating wall fixing device 100 according to the present invention, which is mounted on the secondary insulating wall 200, allows the securing stud 120 to move in six degrees of freedom in the interior space of the base socket 110 and thus can flexibly cope with stress caused by hull motion or thermal contraction of the insulating walls, thereby preventing stress concentration on welds between the secondary sealing wall 300 and the insulating wall fixing device.

Although the present invention has been described with reference to some embodiments, it should be understood that the foregoing embodiments are provided for illustration only and are not to be in any way construed as limiting the present invention, and that various modifications, changes, alterations, and equivalent embodiments can be made by those skilled in the art without departing from the spirit and scope of the invention. The accompanying claims and equivalents thereto are intended to cover such modifications and the like as would fall within the scope and spirit of the invention.

The invention claimed is:

1. An insulating wall fixing device for a liquefied natural gas storage tank comprising a primary insulating wall and a secondary insulating wall that are arranged such that the primary insulating wall is placed over the secondary insulating wall, wherein the insulating wall fixing device is configured to couple the primary insulating wall and the secondary insulating wall, the insulating wall fixing device comprising:
   a base socket; and
   a securing stud inserted into the base socket,
   wherein the base socket comprises an insertion hole through which the securing stud is inserted into the base socket and an interior space in which one end of the securing stud is settled;
   wherein the securing stud comprises an insertion body portion inserted into the interior space of the base socket through the insertion hole, a fastener portion protruding from the insertion body portion of the securing stud and a disk-shaped seat portion outwardly protruding from a circumference of the fastener portion,
   wherein the insertion body portion has a spherical shape and comprises multiple leg members divided by one or more grooves,
   wherein the multiple leg members of the insertion body portion are configured to retract toward the one or more grooves to enter the insertion hole upon inserting the securing stud into the base socket,
   wherein the disk-shaped seat portion comprises a periphery seated over an upper surface of the base socket and configured to be welded to a sealing wall provided between the primary insulating wall and the secondary insulating wall,
   wherein the interior space of the base socket has a spherical space having an inner diameter greater than the insertion body portion, and there is a gap between the interior space of the base socket and the insertion body portion, and
   wherein the securing stud is able to move in six degrees of freedom in the interior space of the base socket.

2. The insulating wall fixing device according to claim 1, wherein, when the insertion body portion is settled in the interior space of the base socket, the multiple leg members are returned to an original shape thereof such that the insertion body portion is prevented from escaping from the interior space of the base socket by interference of a wall surrounding the insertion hole of the base socket.

3. The insulating wall fixing device according to claim 2, wherein the insertion hole has a slope formed along a circumference thereof and downwardly inclined toward a center of the insertion hole.

4. The insulating wall fixing device according to claim 3, wherein the one or more grooves comprises two grooves intersecting each other such that four leg members are formed at the one end of the insertion body portion.

5. An insulating wall fixing device for liquefied natural gas storage a liquefied natural gas storage tank comprising a primary insulating wall and a secondary insulating wall that are arranged such that the primary insulating wall is placed over the secondary insulating wall, wherein the insulating wall fixing device is configured to couple the primary insulating wall and the secondary insulating wall, the insulating wall fixing device comprising:
   a securing stud, one end of which has a spherical shape; and
   a base socket having an interior space configured to receive the one end of the securing stud therein,
   wherein the interior space of the base socket has a spherical shape such that the securing stud is rotatable with the one end of the securing stud received in the base socket;
   wherein the base socket comprises an insertion hole through which the securing stud is inserted into the base socket, the insertion hole having a smaller diameter than the one end of the securing stud;
   wherein the securing stud comprises a groove such that the one end of the securing stud is configured to retract to enter the insertion hole upon inserting the securing stud into the base socket;

wherein the securing stud comprises a fastener portion protruding from the one end and a seat portion outwardly protruding from a circumference of the fastener portion, wherein when the securing stud is settled in the interior space of the base socket, the seat portion of the securing stud comprises a periphery seated over an upper surface of the base socket and configured to be welded to a sealing wall provided between the primary insulating wall and the secondary insulating wall, wherein the interior space of the base socket has a spherical space having an inner diameter greater than the one end of the securing stud, and there is a gap between the interior space of the base socket and the one end of the securing stud, and wherein the securing stud is able to move in six degrees of freedom in the interior space of the base socket.

6. The insulating wall fixing device according to claim 5, wherein, when the one end of the securing stud is inserted into the interior space of the base socket, the retracted one end of the securing stud is returned to an original shape thereof to be prevented from escaping from the interior space of the base socket by interference of a wall surrounding the insertion hole.

* * * * *